(12) United States Patent
Machida

(10) Patent No.: US 6,886,212 B2
(45) Date of Patent: May 3, 2005

(54) WIPER APPARATUS

(75) Inventor: Ken Machida, Sano (JP)

(73) Assignee: Mitsuba Corporation, Kiryu (JP)

( * ) Notice: Subject to any disclaimer, the term of this patent is extended or adjusted under 35 U.S.C. 154(b) by 294 days.

(21) Appl. No.: 10/123,133

(22) Filed: Apr. 17, 2002

(65) Prior Publication Data
US 2002/0152574 A1 Oct. 24, 2002

(30) Foreign Application Priority Data
Apr. 18, 2001 (JP) .......................... 2001-119649

(51) Int. Cl.[7] .............................. B60S 1/16; B60S 1/18
(52) U.S. Cl. ................. 15/250.3; 15/250.31; 296/96.17
(58) Field of Search ........................... 15/250.3, 250.31, 15/250.14, 250.27; 296/96.17, 192, 96.45; 248/200, 214; 74/42–43, 51

(56) References Cited

U.S. PATENT DOCUMENTS 5,222,706 A * 6/1993 Hoshino ...................... 248/200
5,441,227 A * 8/1995 Hayashi ................... 248/274.1
5,873,280 A * 2/1999 Kanazawa ...................... 74/42
6,292,975 B1 * 9/2001 Isii et al. ................. 15/250.31

FOREIGN PATENT DOCUMENTS

JP          A-11-278219          10/1999

* cited by examiner

Primary Examiner—Robert J. Warden, Sr.
Assistant Examiner—Shay L Balsis
(74) Attorney, Agent, or Firm—Oliff & Berridge, PLC

(57) ABSTRACT

A wiper apparatus that decreases the number of tightening means and can efficiently carry out connecting and fixing work with respect to integration of a wiper motor and pivot axes with a pipe member. A linkage piece at the second pivot axis side is arcuately formed so as to match half the outer circumference of a linkage pipe member, a linkage piece at the wiper motor side is formed so as to be arcuate, on the inner circumferential surface of which, an external fitting portion of a pipe member along the outer circumference of the linkage pipe member and an external fitting portion of the linkage piece along the outer circumference of the linkage piece are formed. The respective linkage pieces, that are disposed on the outer circumference of the linkage pipe member, are connected in a laminated manner at the position of the external fitting portion of the linkage pieces.

19 Claims, 8 Drawing Sheets

WIPER APPARATUS

BACKGROUND OF THE INVENTION

1. Field of Invention

The invention relates to a wiper apparatus incorporated in vehicles, such as automobiles and trucks.

2. Description of Related Art

Generally, this type of wiper apparatus, which is a known type, is structured to be an electric device assembled in advance and in which a wiper motor, providing drive power, and a pivot axis, to which a wiper arm is attached, are attached to a pipe member via respective attaching portions. Therefore, the weight thereof is lightened, and the structure is simplified. In addition, the work of assembling the wiper apparatus onto a vehicle is simplified. Thus, in a case of connecting and fixing the attaching portions on the pipe member, it is conventional that the respective attaching portions are separately connected to and fixed at the pipe member. Such a type has been disclosed by, for example, JP-A-11-1278219. In this type, attaching portions, that are formed to match the outer profile of the pipe member, are formed on a gear case that constitutes a wiper motor, and the attaching portions are caused to overlap the pipe member and tightened by tightening means.

In the above-described prior art wiper apparatus, the wiper motor is connected to and fixed at the pipe member with the above-described structure, and, further, a pair of pivot axes are separately connected to and fixed at the pipe member, respectively. Therefore, because tightening means are required to fix the wiper motor and the pair of pivot axes, respectively, the number of components is increased, and tightening work for connection and fixing is required. As a result, there is a problem in that work efficiency is reduced. Further, because a space for connecting respective attaching portions to and fixing the same at the pipe member is required, there is another problem in that downsizing may be sacrificed, and the structure becomes complicated. The invention was developed to solve these and other problems.

SUMMARY OF THE INVENTION

The invention is a unit wiper apparatus having a wiper motor and a pivot axis incorporated in a pipe member via respective attaching portions, wherein linkage pieces are formed on the attaching portions along the outer circumference of respective pipe members, at least parts of the respective linkage pieces are laminated on the outer circumference of the pipe member when connecting the linkage pieces to the pipe member and fixing the same thereat. The connection and fixation on the laminated portion is made by at least one connecting means.

Thereby, as a plurality of linkage pieces can be tightened on the pipe member at one time, the number of tightening means can be decreased and, simultaneously, the linkage pieces can be connected to and fixed at the pipe member with great precision.

In the above-described wiper apparatus, on the inner circumference of one linkage piece of the respective linkage pieces, an external fitting portion of the pipe member, which is externally fitted onto the outer circumference of the pipe member in a slidable state, and an external fitting portion of the linkage piece, which is externally fitted onto the outer circumference of the other linkage piece in a slidable state, are stepwise formed so as to be adjacent to each other in the axial core direction and/or circumferential direction of the pipe member, and one linkage piece is positioned such that the stepped portion thereof is butted to the other linkage piece.

Further, in the above-described wiper apparatus, the external fitting portion of the pipe member, that is externally fitted to the outer circumference of the pipe member in a slidable state, is formed on the inner circumference of one linkage piece according to the invention, and the external fitting portion of the linkage piece, that is externally fitted to the outer circumference of the one linkage in a slidable state, is formed on the inner circumference of the other linkage piece, and a spacer member is provided in a gap formed between the outer circumferential surface of the pipe member and the inner circumference of the other linkage piece.

BRIEF DESCRIPTION OF THE DRAWINGS

The invention will be described with reference to the drawings, in which.

DETAILED DESCRIPTION OF PREFERRED EMBODIMENTS

Figure 1:
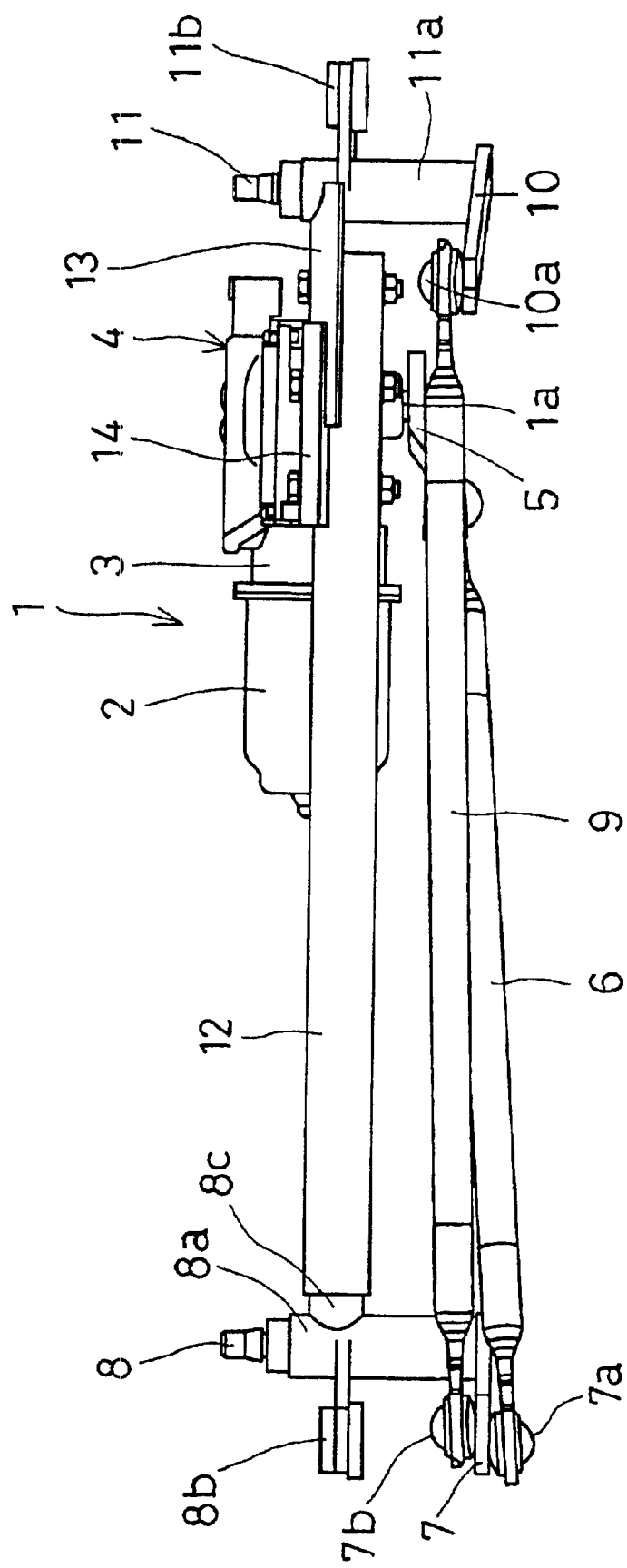
FIG. 1 is a front elevational view of a wiper apparatus.
Figure 2:
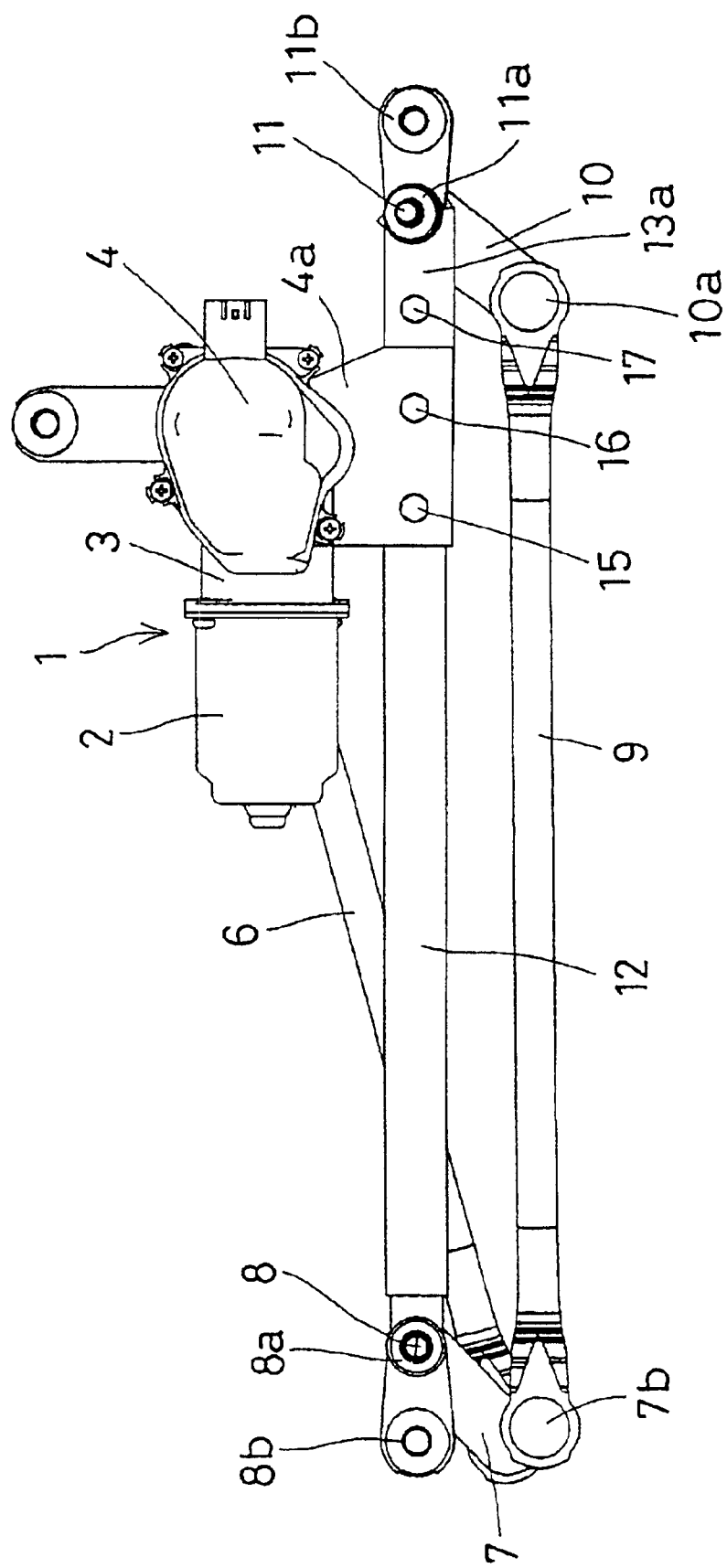
FIG. 2 is a plan view of the wiper apparatus.
Figure 3:
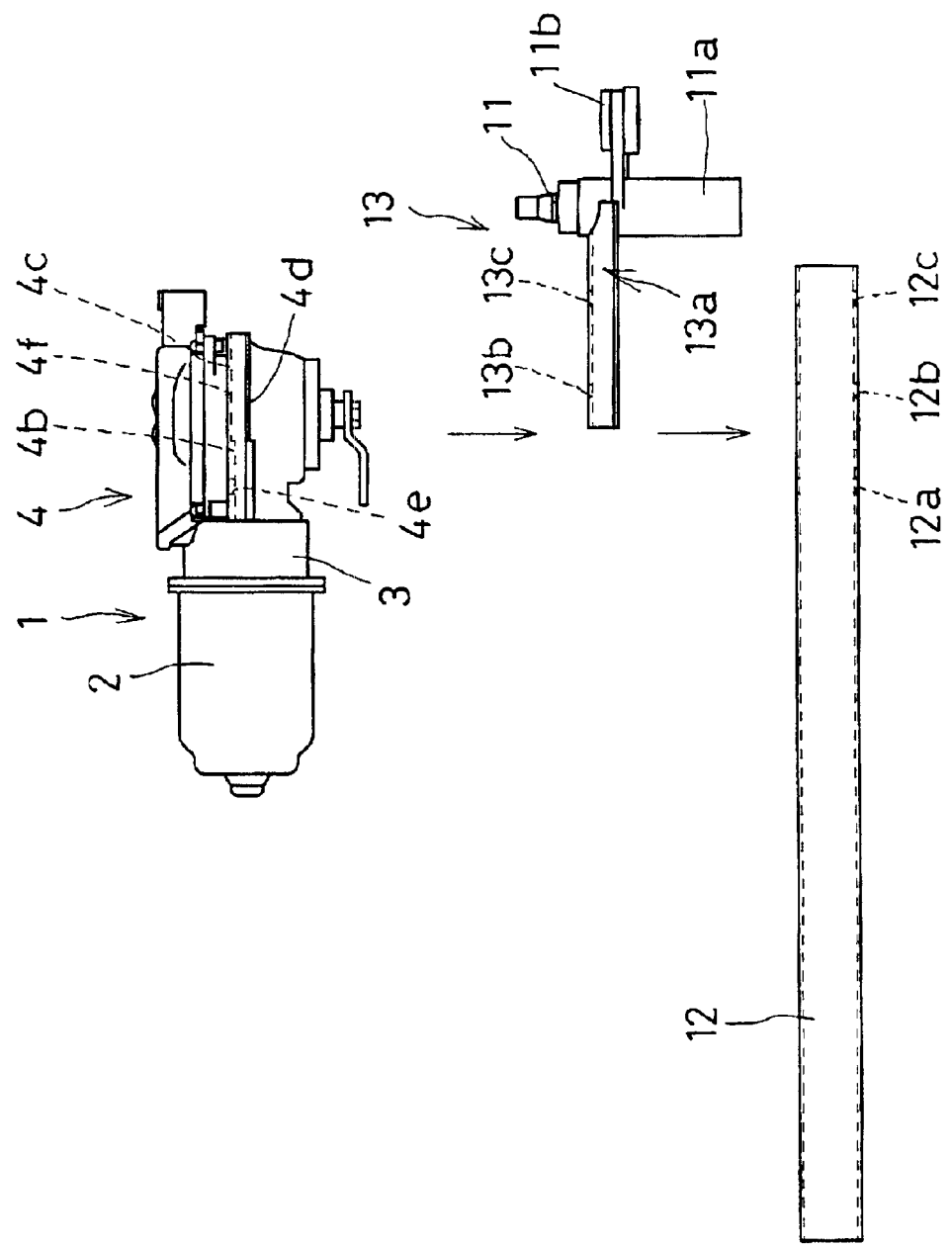
FIG. 3 is a disassembled front elevational view describing a state where a wiper motor and a pivot axis are connected to each other and assembled together.
Figure 4:
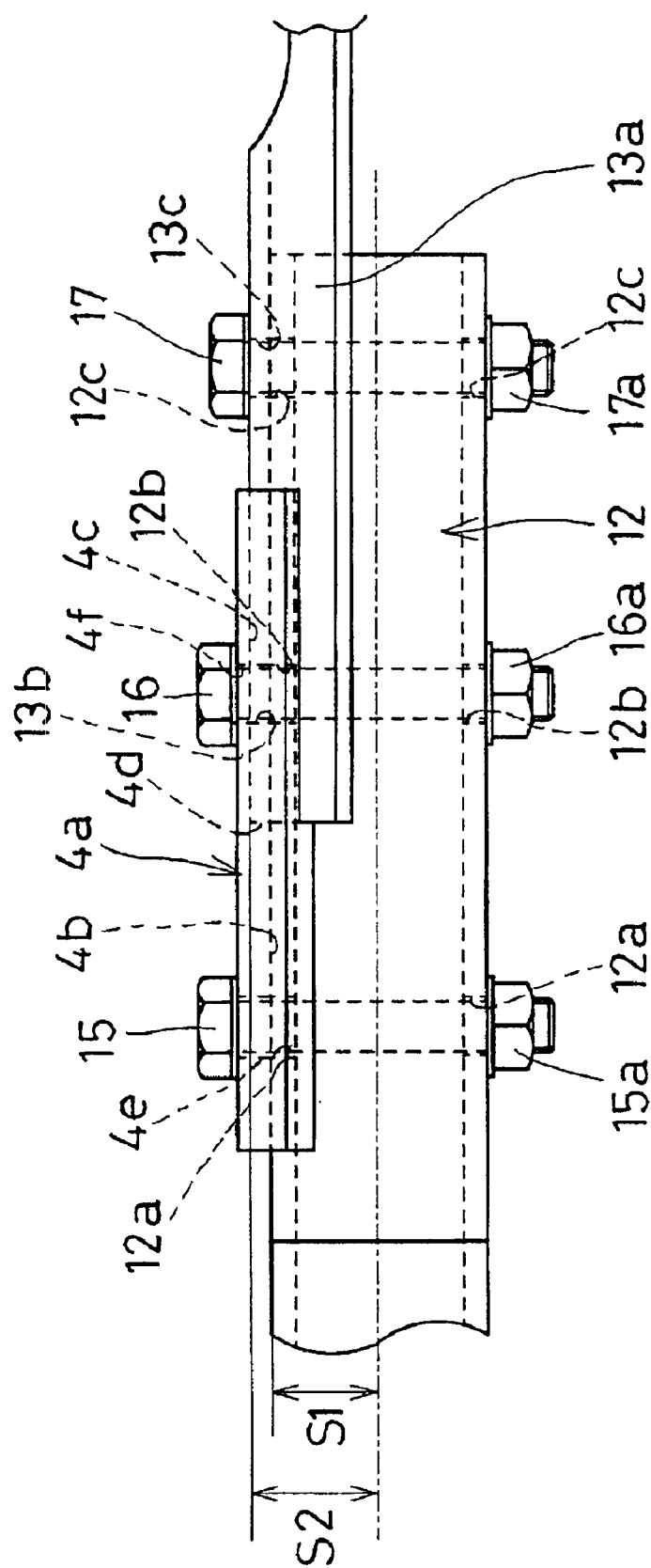
FIG. 4 is an enlarged front elevational view showing the major parts.

Next, a description is given of a first embodiment according to the invention with reference to FIGS. 1 through 4.

In the drawings, 1 denotes a wiper motor that constitutes a wiper apparatus. A gear frame 3, in which a reduction gear mechanism is incorporated, is integrally fixed at an open end side of a cylindrical yoke 2 having a bottom, which constitutes the wiper motor 1, and a bracket 4, corresponding to the attaching portions of the invention, is integrally formed on the gear frame 3. Although drive power of the wiper motor 1 is coupled to a drive shaft 1a via the reduction gear mechanism, the drive shaft 1a is rotatably supported on the gear frame 3 in such a state where the drive shaft 1a extends in a direction orthogonal to an output shaft of the wiper motor 1.

5 denotes a crank arm that is coupled to the drive shaft 1a, and the base end portion of the first link 6, composed of a pipe member, is rotatably coupled to the crank arm 5. The tip end portion of the first link 6 is rotatably coupled to the base end portion of the first link arm 7 via a ball joint 7a, and the lower end portion of the first pivot shaft 8 is integrally coupled to the tip end portion of the first link arm 7.

Furthermore, the base end portion of the second link 9 composed of a pipe member as in the first link 6 is rotatably coupled to the base end portion of the first link arm 7 via a ball joint 7b. The tip end portion of the second link 9 is rotatably coupled to the base end portion of the second link arm 10 via a ball joint 10a. And, the base end portion of the second pivot shaft 11 is integrally coupled to the tip end portion of the second link arm 10. The structure of these links is the same as in known wiper apparatuses. Furthermore, sleeves 8a, 11a are rotatably disposed with respect to the first and second link arms 7, 10 so that the first and second pivot shafts 8, 11 are internally fitted therein so as to be rotatable therein, and the sleeves 8a, 11a are set so as to be integrally fixed at a vehicle body side via supporting pieces 8b, 11b.

In the wiper apparatus, a supporting portion 8c formed at the sleeve 8a of the first pivot shaft 8 is integrally coupled to one end portion of a linkage pipe member 12 corresponding to the pipe member of the invention, and the second pivot shaft 11 and the wiper motor 1 are coupled to the other end portion of the linkage pipe member 12 as described later, whereby the wiper apparatus is made into a unit. The invention is embodied for built-in coupling of the first pivot shaft 8 and the wiper motor 1 at the other end portion of the linkage pipe member 12.

That is, the first, second and third bolt through-holes 12a, 12b, 12c are, respectively, drilled and arranged in a row in the axial core direction at three points with appointed spacing therebetween at the other end portion of the linkage pipe member 12. On the other hand, an attaching portion 13 is integrally formed at the sleeve 11a, into which the second pivot shaft 11 is internally and rotatably fitted, such that the attaching portion 13 protrudes toward the outer diameter side. The attaching portion 13 is formed by arcuately folding a plate-like member having an appointed plate thickness, so that its protruding portion becomes a linkage piece 13a, which covers almost half the circumference of the other end portion of the above-described linkage pipe member 12. The linkage piece 13a is formed at the external fitting portion of a pipe member set to have an inner radius S1, which is roughly equal to the outer radius of the linkage pipe member 12. First and second bolt insertion holes 13b, 13c are arranged and drilled in the axial core direction. When the linkage piece 13 of the attaching portion is disposed so as to be slidable over the half of the outer circumference of the other end portion where the second and third bolt insertion through-holes 12b, 12c of the linkage pipe member 12 are formed, the first and second bolt insertion through-holes 13b, 13c and the second and third bolt insertion through-holes 12b, 12c are respectively disposed so as to communicate with each other.

Further, as described above, a bracket 4 is integrally formed on the gear frame 3 of the wiper motor 1. A linkage piece 4a which extends in the axial core direction at one side portion of the bracket 4 is formed so that a plate-like member having an appointed plate thickness is arcuately folded. In the linkage piece 4a, one end side half section, in the axial core direction, is formed at the external fitting portion 4b of the linkage pipe member 12 so that the dimension thereof is set to have an inner diameter S1, which is roughly the same as the outer diameter of the above-described linkage pipe member 12. The other end side half section is formed at the external fitting portion 4c of the linkage piece 4a with a dimension set to have an inner diameter S2 which is roughly the same as the outer diameter of the linkage piece 13a of the attaching portion secured at the sleeve 1a side of the pivot axis. A stepped portion 4d is formed between the external fitting portion 4b of the pipe member and the external fitting portion 4c of the linkage piece. In addition, at the end of the bracket linkage piece 4a, a first bolt insertion hole 4e positioned at the external fitting portion 4b of the pipe member, and a second bolt insertion hole 4f position at the external fitting portion 4c of the linkage piece are positioned and drilled in the axial core direction.

The bracket linkage piece 4a is disposed in a state where the external fitting portion 4b of the pipe member of one end side half section is slidably brought into contact with the outer circumference at the portion at which the first bolt insertion through-hole 12a of the linkage pipe member 12 is formed, so that the bracket linkage piece 4a is laminated on a part of the outer circumference of the linkage piece 13a of the attaching portion at the first pivot axis 11 side disposed on the outer circumference of the linkage pipe member 12. The external fitting portion 4c of the linkage piece of the other end side half section is slidably brought into contact with the outer circumference of the linkage piece 13a of the attaching portion, whereby the linkage piece 13a of the attaching portion at the pivot axis 8 side and the bracket linkage piece 4a at the wiper motor 1 side are set so as to be laminated at the portion where the second through-hole 12b of the linkage pipe member 12 is formed. At this time, the bracket linkage piece 4a is laminated so that its position in the axial core direction is determined because the stepped portion 4d is brought into contact with the protrusion tip end portion of the linkage piece 13a of the attaching portion at the pivot axis 8 side. Further, the bracket linkage piece 4a is positioned in the circumferential direction so that, in the laminated state, the first bolt insertion hole 4e of the bracket linkage piece 4a and the first through-hole 12a of the linkage pipe member 12 communicate with each other. Additionally, the second bolt insertion hole 4f, the first bolt insertion hole 13b of the linkage piece 13a of the attaching portion 13, and the second through-hole 12b of the linkage pipe communicate with each other, and the second bolt insertion hole 13c of the linkage piece 13a of the attaching portion 13 and the third through-hole 12c of the linkage pipe member 12 communicate with each other. Positioning thereof in the outer circumferential direction can be adjusted in the laminating direction, that is, by visually checking it from one side of the linkage pipe member 12.

Thus, after adjusting the position in the circumferential direction in the above-described laminated state, first, second and third bolts 15, 16, 17 are inserted into the first, second and third bolt through-holes 12a, 12b, 12c, after first passing through, respectively, the first bolt insertion hole 4e; the second bolt insertion hole 4f and first bolt insertion hole 13b; and the second bolt insertion hole 13c, nuts 15a, 16a and 17a are tightened at the ends of the respective bolts 15, 16, 17, whereby the second pivot axis 11 and the wiper motor 1 are set so that these are, respectively, fixed at the linkage pipe member 12.

At this time, where the second bolt through-hole 12b, the bracket 4 side second bolt insertion hole 4f, and the attaching portion 13 side first insertion hole 13b, which are positioned at the middle of the laminated section of the respective linkage pieces 13a, 4a, are tightened by the second bolt 16 first, it is possible to temporarily position and retain the wiper motor 1 and the second pivot axis 11. By then tightening the first bolt 15 and the third bolt 17 one after another in this state, coupling work of the respective members of the wiper motor 1, the first pivot axis 8, and the linkage pipe member 12 can be easily carried out.

In the embodiment of the invention, which is so structured, in a case where a unit wiper apparatus in which a wiper motor 1 and a sleeve 8a, supporting the first pivot shaft 8, are integrally coupled to and fixed at the linkage pipe member 12, respective linkage pieces 4a, 13a formed at the gear frame 3 of the wiper motor 1 and the sleeve 11a of the second pivot shaft 11 are arcuately formed along half the outer circumference of the linkage pipe member 12 in such a way the components are partially laminated on each other. By inserting the second bolt 16 into the respective bolt insertion holes 4f, 13b and the second through-hole 12b, which are aligned with one another, in the laminated section of these linkage pieces 13a, 4a, the respective linkage pieces 13a, 4a can be fixed on the linkage pipe member 12 at one time by tightening the nut 16a. As a result, contra to the prior art, or conventional, types in which attaching portions separately provided at the wiper motor and a pair of pivot axes are individually tightened with respect to the pipe member, there is no case where a plurality of tightening means are required to fix the linkage pieces 13a, 4c to the linkage pipe member 12. When a plurality of tightening means are required, the number of components increases, and work efficiency decreases. In addition, with the invention the number of tightening means (bolts) can be decreased, thereby improving work efficiency. Further, there is no requirement on the pipe member for space for individually attaching respective attaching portions as required in the prior art wiper apparatuses. For that reason, the wiper apparatus can be made smaller, and the structure simplified.

Still further, in this case, positioning of the respective mating partners among the first, second and third bolt insertion holes 13b, 13c, 4e, 4f, which are drilled in the respective linkage pieces 13a, 4a, and the first, second and third bolt insertion holes 12c, 12b, 12c, which are drilled in the linkage pipe member 12 can be carried out at only one side of the linkage pipe member 12. Therefore, because it is not necessary to carry out work while checking both sides of the pipe member as is the case in those in which conventional linkage pieces which are tightened along both sides in the diametrical direction of the pipe member, positioning can be simply and easily carried out, wherein connection and fixing can be smoothly and efficiently executed with great efficiency.

Still further, in the present embodiment of the invention, positioning of the linkage pieces 13a, 4a in the axial core direction can be carried out by only one linkage piece, that is, in the embodiment, by bringing the stepped portion 4d formed on the bracket linkage piece 4a at the wiper motor 1 side into butting contact with the protrusion tip end portion of the linkage piece 13a of the attaching portion at the first pivot axis 8 side. Therefore, positioning work of the respective members can be further easily carried out, whereby the connection and fixing thereof is further smoothly and quickly carried out.

It is needless to say that the invention is not limited to the above-described embodiment. Other types of tightening means, for example, pipe nuts (blind nuts), rivets, cotter keystyle means, etc., may be employed in addition to the use of bolts and nuts as in the above-described embodiment. Also, screw holes and screws may be employed instead of the through-holes formed at the bracket, the attaching portions and the support and used with bolt/nut combinations.

Figure 5:
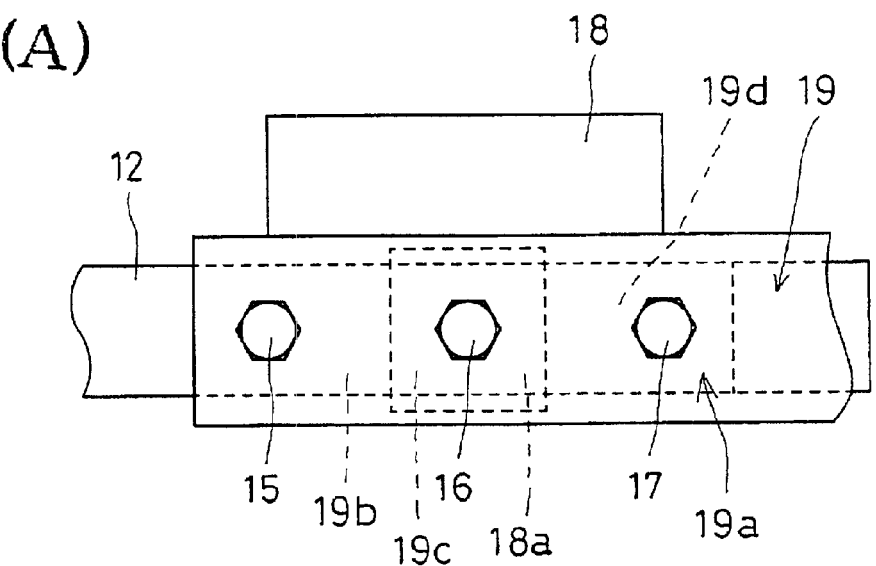
FIG. 5(A) is a plan view showing the major parts of a second embodiment of the wiper apparatus according to the invention.
FIG. 5(B) is a front sectional view thereof.
Figure 5:
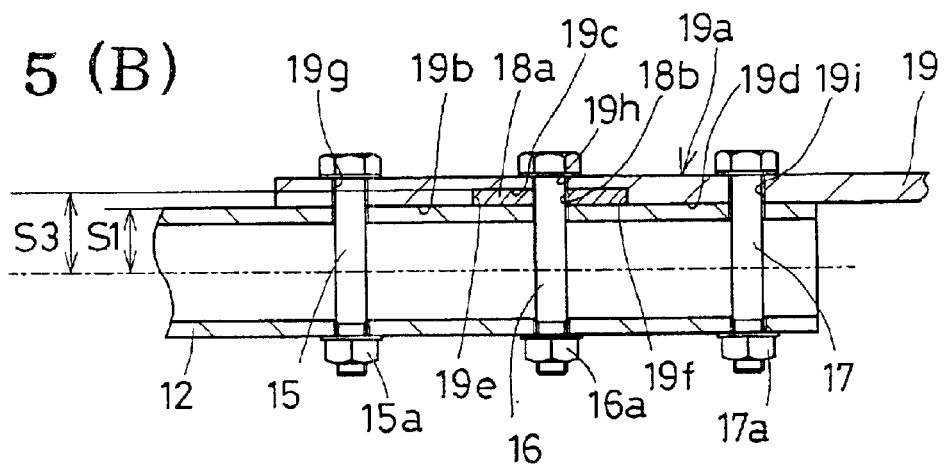

In addition, the invention can be structured as in a second embodiment shown in FIGS. 5(A) and 5(B). In the second embodiment, the linkage piece 18a formed at the bracket 18 at the wiper motor side is formed as an external fitting portion over the pipe member 12 having an inner diameter S1 which is roughly equal to the outer diameter of the linkage pipe member 12, and a bolt through-hole 18b is arranged and drilled in the linkage piece 18a. On the other hand, at the linkage piece 19a of the attaching portion 19 provided at the second pivot shaft 11 side, the external fitting portion 19b over the pipe member 12 is set to have an inner diameter S1 which is substantially equal to the outer diameter of the linkage pipe member 12, the external fitting portion 19c over the linkage piece 18a set to have an inner diameter S3 roughly equal to the outer diameter of the above-described linkage piece 18a of the bracket 18, and the external fitting portion 19d over the pipe member 12, is set to an inner diameter S1 which is also substantially equal to the outer diameter of the linkage pipe member 12. The external fitting portions 19b, 19c, 19d are formed in a line in the axial core direction on the inner circumference from the protrusion tip end side to the base end side, and stepped portions 19e, 19f are, respectively, formed on both sides of the external fitting portion 19c over the linkage piece 18a. Further, the first, second and third bolt insertion holes 19g, 19h, 19i are arranged and drilled at the respective portions. The bracket linkage piece 18a is slidably disposed on the outer circumference of the linkage pipe member 12 in a state where the bolt insertion hole 18b formed in the bracket linkage piece 18a and the second bolt through-hole 12b of the linkage pipe member 12 are aligned with each other. Because the external fitting portion 19c of the linkage piece 19a, positioned between the external fitting portions 19b, 19d of the attaching portion 19, is slidably brought into contact with the outer circumference of the bracket linkage piece 18a, positioning of the respective linkage pieces 18a, 19a is carried out. Also, the linkage piece 18a and the external fitting portion 19c are set so that these pieces are disposed on the linkage pipe member 12 so as to be laminated by the bolt through-hole 12b. In this state, the first, second and third bolt insertion holes 19g, 19h, 19i of the linkage piece 19a of the attaching portion 19, the first, second and third bolt through-holes 12a, 12b, 12c of the linkage pipe member 12 corresponding thereto, and the bolt insertion hole 18b of the bracket linkage 18a are aligned with each other in the circumferential direction from the laminating direction so as to communicate with each other. Because the laminated members are tightened by using the second, first and third bolts 16, 15, 17, the respective members are set so that they are connected and fixed. Further, in this case, it is easy to position the respective linkage piece 18a and the external fitting member 19c in the axial core direction and the circumferential direction. In addition, the respective members can be fixed at one time by tightening them using the second bolt through-hole 12b, and bolt 16, to set the laminated portion.

Figure 6:
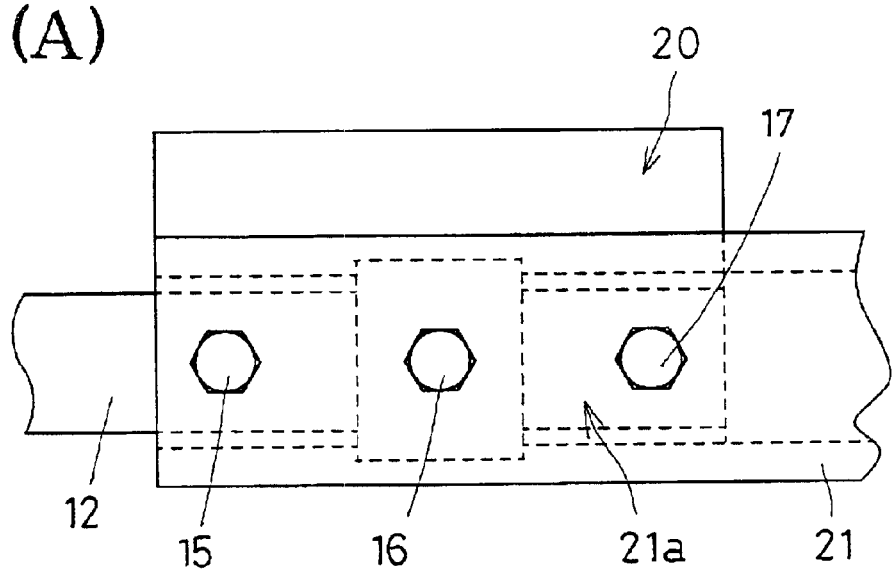
FIG. 6(A) is a plan view showing the major parts of a third embodiment of the wiper apparatus according to the invention.
FIG. 6(B) is a front sectional view thereof.
Figure 6:
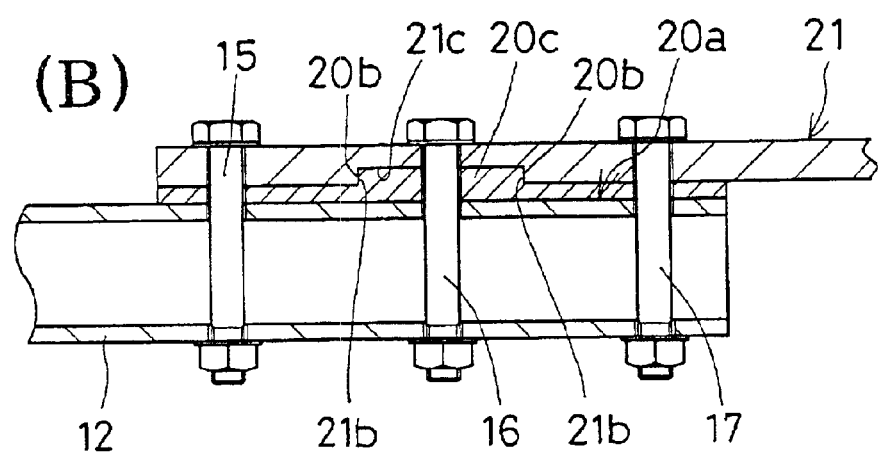

Further, the invention can be structured as in a third embodiment shown in FIGS. 6(A) and 6(B). The third embodiment is structured so that, while a protrusion portion 20c protruding to the outer diameter side via a stepped portion 20b is formed on the outer circumferential surface of an arcuate attaching piece 20a formed on the bracket 20 at the wiper motor side, a recessed portion 21c formed on the outer diameter side via the stepped portion 21b along the outer circumferential surface of the bracket attaching piece 20a is formed on the inner circumferential surface of the attaching piece 21a formed at the attaching portion 21 at the pivot axis side. Positioning of the respective attaching pieces 20a, 21a in the axial core direction is carried out by bringing the above-described stepped portions 20b, 21b into contact with each other. All other structure is roughly the same as that of the above-described second embodiment. Also, in the present embodiment, the respective members can be connected and fixed by tightening via the second bolt 16 at the lamination portion, and the positioning can be carried out while visually checking the respective linkage pieces 20a, 21a from the laminating direction, whereby work efficiency can be improved.

Figure 7:
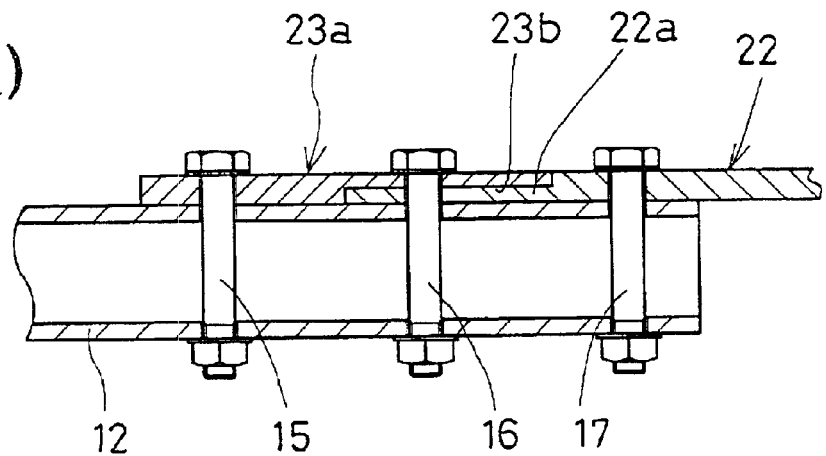
FIG. 7(A) is a front sectional view showing the major parts of a fourth embodiment of the wiper apparatus according to the invention.
FIG. 7(B) is a front elevational view thereof.
Figure 7:
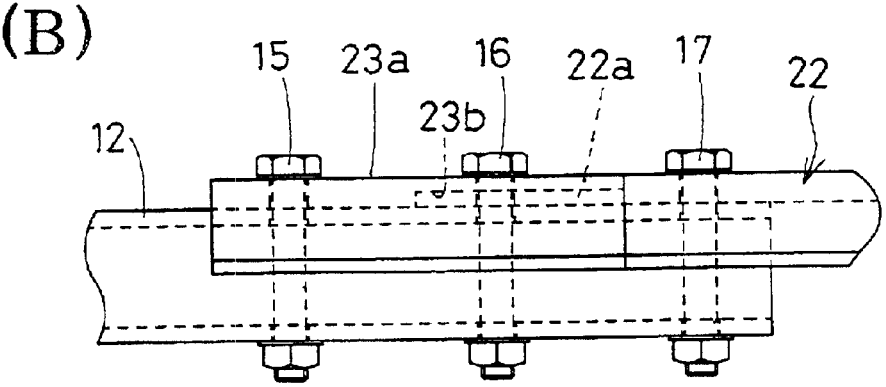

Also, the invention can be structured as in a fourth embodiment shown in FIGS. 7(A) and 7(B). The fourth embodiment is structured so that a linkage piece 22a, which is formed at the attaching portion 22 at the pivot axis side and laminated on the linkage pipe member 12 which is formed to be narrower in the circumferential direction, an external fitting portion 23b with the linkage piece 22a of the attaching portion internally fitted thereto. The external fitting portion 23b is formed on a bracket linkage piece 23a at the wiper motor side, and the external fitting portion 23b of the bracket linkage piece 23a and the linkage piece 22a are adjacent to each other in the axial core direction and the circumferential direction. Therefore, in the embodiment, positioning in the axial core direction and the circumferential direction can be carried out in a state where the external fitting portion 23b of the bracket linkage piece 23a is laminated on the linkage piece 22a of the attaching portion 22, wherein only micro-adjustment is sufficient as regards the positioning from the laminating direction, and the positioning can be further simplified. Also, in the embodiment, the respective members can be connected and fixed by tightening via the second bolt 16 at the laminating portion. The configuration can also be reversed wherein the linkage piece 22a is a step-up to be separated from the linkage pipe member 12. In this configuration, the external fitting portion 23b is a stepped down portion that fits between the linkage piece 22a and the linkage pipe member 12.

Figure 8:
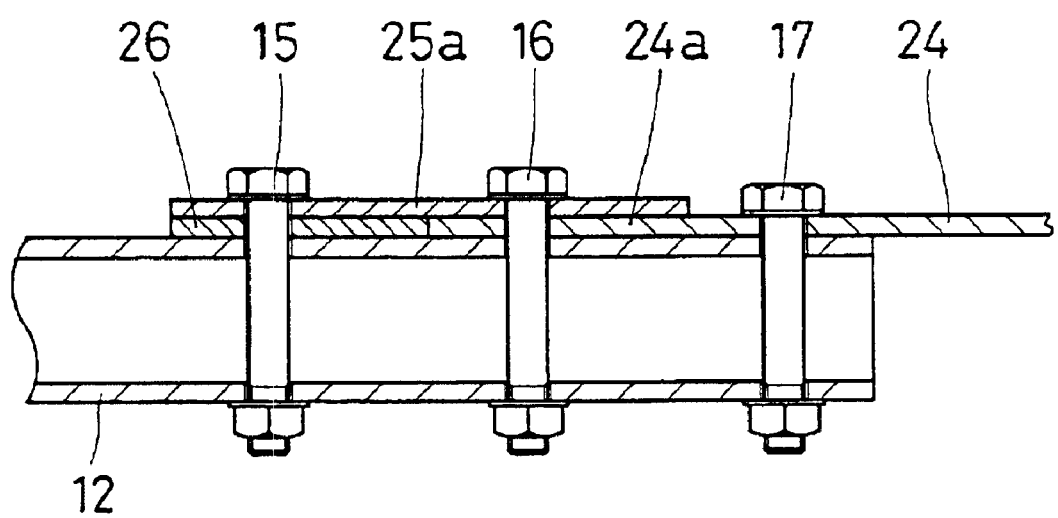
FIG. 8 is a front sectional view showing the major parts of the fifth embodiment of a wiper apparatus according to the invention.

Further, the invention can be structured as in a fifth embodiment shown in FIG. 8. In the embodiment, the linkage piece 24a formed at the attaching portion 24 at the pivot axis side has a circumference having an inner diameter which is roughly equal to the outer diameter of the linkage pipe member 12, and the inner circumference of a bracket linkage piece 25a is formed so as to have an inner diameter which is roughly equal to the outer diameter of the linkage piece 24a of the attaching portion 24. The embodiment is structured so that the linkage pieces 24a, 25a are partially laminated to each other, and are tightened by the second bolt 16 at the laminated portion, wherein a resilient member 26, acting as a spacer, intervenes in a gap formed between the outer circumferential surface of the linkage pipe member 12 and the inner circumferential surface of the bracket linkage piece 25a. Where the invention is thus structured, positioning can be visually checked from the laminating direction, and the respective members can be connected and fixed at one time by tightening the same via the second bolt 16 at the laminating portion, wherein dimensional unevenness can be absorbed, and structure of the bracket linkage piece 25a can be simplified. In addition, it is not necessary that the spacer member is limited to the above-described resilient member. A rigid member may be acceptable, which is capable of absorbing dimensional unevenness.

Still further, although the above-described respective embodiments are structured so that the linkage pieces are laminated in the same direction as that of the radial direction of the pipe member, the linkage pieces may be fitted in the radial direction of the pipe member, and may be tightened by using any tightening means passing through the pipe member.

What is claimed is:

1. A unit wiper apparatus having a wiper motor, a first pivot axis and a second pivot axis each incorporated in a respective sleeve, a pipe member extending between the respective sleeves, the pipe member having a plurality of attaching portions;

a first linkage piece and a second linkage piece, the first linkage piece extending from, and substantially perpendicular to, one sleeve of the respective sleeves, and the second linkage piece extending from the wiper motor; and at least one connecting element, wherein the first and second linkage pieces are formed to be received on the attaching portions along an outer circumference of the pipe member, at least parts of the first linkage piece and the second linkage piece are laminated on the outer circumference of the pipe member when connecting the first linkage piece and the second linkage piece to the pipe member and fixing the same thereat, the connection and fixation on the laminated portion is made by the at least one connecting element.

2. The wiper apparatus according to claim 1, wherein an inner circumference of one linkage piece, of the first linkage piece and the second linkage piece, is fitted to an attachment portion on the outer circumference of the pipe member in a slidable state, and a fitting portion of an other linkage piece, of the first linkage piece and the second linkage piece, is externally fitted onto at least a part of the fitting portion of an outer circumference of the one linkage piece in a slidable state, the at least other linkage piece is stepwise formed so the fitting portions are adjacent to each other in one of an axial core direction and a circumferential direction of the pipe member, and the one linkage piece is positioned so the stepped portion thereof is butted to the other linkage piece.

3. The wiper apparatus according to claim 1, wherein the fitting portion of the one linkage piece that is fitted to the outer circumference of the pipe member in a slidable state is formed on the inner circumference of the one linkage piece, and the at least part of the fitting portion of the other linkage piece that is fitted to the outer circumference of the one linkage piece in a slidable state is formed on the inner circumference of the other linkage piece, and a spacer member is provided in a gap formed between the outer circumferential surface of the pipe member and the inner circumference of the other linkage piece.

4. A linkage system, comprising:

a support having an outer surface;

an attaching portion for attachment to the support;

a bracket for attachment to the support; and a plurality of attachment devices, an attachment device passing through at least one of the attaching portion and the bracket and further passing at least into the support to be retained in the support, wherein the attaching portion and the bracket are in contact with each other and have, at least, a portion laminated one over the other, and attached to the support.

5. The linkage system according to claim 4, wherein one attachment device passes through the attaching portion and the bracket to be retained in the support.

6. The linkage system according to claim 5, wherein the plurality of attachment devices pass completely through the support and are fixed to the support by means of a part extending from the support.

7. The linkage system according to claim 6, wherein each attachment device is one of a bolt/nut combination, a rivet, and a cotter key style device.

8. The linkage system according to claim 4, wherein the plurality of attachment devices comprise screws that are threadably received in the support.

9. The linkage system according to claim 4, wherein the plurality of attachment devices pass completely through the support and are fixed to the support by means of a part extending from the support.

10. The linkage system according to claim 9, wherein each attachment device is one of a bolt/nut combination, a rivet, and a cotter key style device.

11. The linkage system according to claim 4, wherein the bracket and a linkage area of the attaching portion have a cross section complementary to the support.

12. The linkage system according to claim 4, wherein the attaching portion has a linkage piece that is complementary to and overlies the support, and the bracket has a first portion complementary to and overlaying the linkage piece and a second portion complementary to and overlaying the support, wherein a first attachment device passes through the bracket, a second attachment device passes through the bracket and linkage piece, and a third attachment device passes through the linkage piece to be retained by the support.

13. The linkage system according to claim 4, wherein the attaching portion has a linkage piece shaped to be complementary to the support and having first and second sections in contact with the support and a third section recessed from the first section and second section, the bracket received in the third section and shaped complimentarily to the support and the third section, a first attachment device passing through the second section, a second attachment device passing through the third section and the bracket, and a third attachment device passing through the first section to be retained by the support.

14. The linkage system according to claim 4, wherein the attaching portion has a linkage piece shaped to be complementary to the support and having first and second sections with a third section therebetween, the third section recessed relative to the first and second sections; the bracket also shaped complementary to the support and having an outer surface with a first section, a second section, and a raised third section such that the outer surface of the bracket mates with the inner surface of the linkage piece, and a first attachment device passes through the first sections, a second attachment device passes through the third sections, and a third attachment device passes through the second sections to be retained by the support.

15. The linkage system according to claim 4, wherein the attaching portion has a linkage piece, the linkage piece is complementary to the support and having a first section and a second section having a stepped down outer surface; the bracket having a first portion complementary to and overlaying the stepped down second section and a second portion overlaying the support and complementary thereto; and a first attachment device passes through the second portion of the bracket, a second attachment device passes through the first section of the linkage piece, and a third attachment device that passes through the first portion of the bracket and the second section of the linkage piece to be retained by the support.

16. The linkage system according to claim 4, wherein the attaching portion has a linkage piece, the linkage piece is complementary to the support and having a first section and a second section having a stepped up inner surface; the bracket having a first portion complementary to and underlaying the stepped up second section and a second portion overlaying the support and complementary thereto; and a first attachment device passes through the second portion of the bracket, a second attachment device passes through the first section of the linkage piece, and a third attachment device that passes through the first portion of the bracket and the second section of the linkage piece to be retained by the support.

17. The linkage system according to claim 4, further comprising a filler member, wherein the attaching portion has a linkage piece, that is complementary to the support, the bracket overlays a first portion of and is complementary to the linkage piece, a second portion extending over, complementary to but separated from the support, the filler member inserted between the second portion of the bracket and the support, a first attachment device passing through the second portion of the bracket and the filler member, a second attachment device passing through the linkage piece, and a third attachment device passing through the and the linkage piece to be retained by the support.

18. The linkage system according to claim 17, wherein the filler member is made of a resilient material.

19. The linkage system according to claim 17, wherein the filler member is made of a non-compressible, shaped material.

* * * * *